United States Patent
Furuya et al.

(10) Patent No.: US 10,907,255 B2
(45) Date of Patent: Feb. 2, 2021

(54) GALVANIZED STEEL SHEET AND MANUFACTURING METHOD THEREFOR

(71) Applicant: JFE STEEL CORPORATION, Tokyo (JP)

(72) Inventors: Shinichi Furuya, Tokyo (JP); Akira Matsuzaki, Tokyo (JP); Hiroyuki Masuoka, Tokyo (JP); Katsuya Hoshino, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 16/499,419

(22) PCT Filed: Feb. 1, 2018

(86) PCT No.: PCT/JP2018/003331
§ 371 (c)(1),
(2) Date: Sep. 30, 2019

(87) PCT Pub. No.: WO2018/179816
PCT Pub. Date: Oct. 4, 2018

(65) Prior Publication Data
US 2020/0024744 A1    Jan. 23, 2020

(30) Foreign Application Priority Data
Mar. 30, 2017    (JP) .................. 2017-066483

(51) Int. Cl.
*B32B 15/04*    (2006.01)
*C23C 28/00*    (2006.01)
(Continued)

(52) U.S. Cl.
CPC ............... *C23C 22/53* (2013.01); *B05D 1/00* (2013.01); *B05D 1/18* (2013.01); *B05D 7/00* (2013.01); *B05D 7/14* (2013.01); *B32B 15/013* (2013.01); *B32B 15/04* (2013.01); *B32B 15/043* (2013.01); *B32B 15/08* (2013.01); *B32B 15/085* (2013.01); *B32B 15/18* (2013.01); *C23C 2/06* (2013.01); *C23C 2/26* (2013.01); *C23C 2/40* (2013.01); *C23C 22/06* (2013.01); *C23C 22/07* (2013.01); *C23C 22/83* (2013.01); *C23C 28/00* (2013.01); *C23C 28/30* (2013.01); *C23C 28/321* (2013.01); *C23C 28/3225* (2013.01); *C23C 28/345* (2013.01); *C23C 30/00* (2013.01); *C23C 30/005* (2013.01); *B05D 2202/10* (2013.01); *B05D 2202/15* (2013.01); *Y10T 428/1259* (2015.01); *Y10T 428/1266* (2015.01); *Y10T 428/12611* (2015.01); *Y10T 428/12618* (2015.01); *Y10T 428/12667* (2015.01); *Y10T 428/12757* (2015.01); *Y10T 428/12972* (2015.01); *Y10T 428/12979* (2015.01); *Y10T 428/2495* (2015.01); *Y10T 428/24967* (2015.01); *Y10T 428/24975* (2015.01); *Y10T 428/26* (2015.01); *Y10T 428/263* (2015.01);
(Continued)

(58) Field of Classification Search
CPC ......... C23C 30/00; C23C 30/005; C23C 2/06; C23C 2/26; C23C 2/40; C23C 22/53; C23C 22/83; C23C 22/06; C23C 22/07; C23C 28/00; C23C 28/3225; C23C 28/345; C23C 28/30; C23C 28/321; B05D 1/18; B05D 1/00; B05D 7/14; B05D 7/00; B05D 2202/10; B05D 2202/15; B32B 15/04; B32B 15/013; B32B 15/043; B32B 15/08; B32B 15/085; B32B 15/18; Y10T 428/12611; Y10T 428/1259; Y10T 428/12618; Y10T 428/1266; Y10T 428/12757; Y10T 428/12972; Y10T 428/12979; Y10T 428/2495; Y10T 428/24967; Y10T 428/24975; Y10T 428/26; Y10T 428/263; Y10T 428/264; Y10T 428/265; Y10T 428/27; Y10T 428/12667
See application file for complete search history.

(56) References Cited

U.S. PATENT DOCUMENTS 6,562,474 B1 *    5/2003    Yoshimi ................... B05D 5/00
428/472.3

FOREIGN PATENT DOCUMENTS

| EP | 2 377 968 A1 | 10/2011 |
|---|---|---|
| EP | 3 112 500 A1 | 1/2017 |
| EP | 3 112 501 A1 | 1/2017 |
| JP | H02-190483 A | 7/1990 |
| JP | H06-002161 A | 1/1994 |
| JP | H10-015483 A | 1/1998 |

(Continued)

OTHER PUBLICATIONS

Mar. 31, 2020 Extended Search Report issued in European Patent Application No. 18775028.6.
(Continued)

*Primary Examiner* — Michael E. La Villa
(74) *Attorney, Agent, or Firm* — Oliff PLC (57) ABSTRACT

There is provided a high-strength galvanized steel sheet and a relatively low-strength galvanized steel sheet that undergoes complex forming, a galvanized steel sheet that exhibits consistently excellent press formability and that generates no hazardous fumes during welding as well as a manufacturing method therefor. The galvanized steel sheet has an oxide layer on the surface, where the oxide layer has an average thickness of 20 nm or more, and the oxide layer contains 30 mg/m² or more of Zn, 1.0 mg/m² or more of S, and 50 mg/m² or more and 1,000 mg/m² or less of polyethylene particles having an average particle size of 5.0 µm or less.

20 Claims, 1 Drawing Sheet

(51) Int. Cl.
| | |
|---|---|
| *C23C 2/06* | (2006.01) |
| *C23C 2/26* | (2006.01) |
| *C23C 22/53* | (2006.01) |
| *C23C 22/83* | (2006.01) |
| *B05D 1/18* | (2006.01) |
| *B05D 7/14* | (2006.01) |
| *C23C 22/06* | (2006.01) |
| *B05D 7/00* | (2006.01) |
| *C23C 30/00* | (2006.01) |
| *B05D 1/00* | (2006.01) |
| *B32B 15/01* | (2006.01) |
| *C23C 22/07* | (2006.01) |
| *B32B 15/18* | (2006.01) |
| *B32B 15/08* | (2006.01) |
| *C23C 2/40* | (2006.01) |
| *B32B 15/085* | (2006.01) |

(52) U.S. Cl.
CPC ........ *Y10T 428/264* (2015.01); *Y10T 428/265* (2015.01); *Y10T 428/27* (2015.01)

(56) References Cited

FOREIGN PATENT DOCUMENTS

| | | |
|---|---|---|
| JP | 2005-248262 A | 9/2005 |
| JP | 3807341 B2 | 8/2006 |
| JP | 4329387 B2 | 9/2009 |
| JP | 2009-235431 A | 10/2009 |
| JP | 2013-060624 A | 4/2013 |
| JP | 5386842 B2 | 1/2014 |
| JP | 2016-098380 A | 5/2016 |

OTHER PUBLICATIONS

Apr. 3, 2018 International Search Report issued in International Patent Application No. PCT/JP2018/003331.

* cited by examiner

GALVANIZED STEEL SHEET AND MANUFACTURING METHOD THEREFOR

TECHNICAL FIELD

This application relates to a galvanized steel sheet that exhibits low sliding resistance during press forming and thus excellent press formability and to a manufacturing method therefor.

BACKGROUND

Galvanized steel sheets are widely used in diverse fields centered on automobile body applications. Such galvanized steel sheets typically undergo press forming before use. Galvanized steel sheets, however, have a disadvantage in that press formability is inferior to that of cold-rolled steel sheets. This is because galvanized steel sheets have higher sliding resistance within a press die than cold-rolled steel sheets. Specifically, galvanized steel sheets that exhibit high sliding resistance are not readily fed into a high sliding-resistance portion between a press die and a bead. As a result, breakage of the steel sheets tends to arise.

For this reason, a method of applying a highly viscous lubricating oil is widely employed as a method of enhancing press formability when galvanized steel sheets are used. In this method, however, the lubricating oil is highly viscous, and consequently, coating defects arise in a coating step due to degreasing failure. In addition, there is a problem, for example, in which press performance becomes unstable due to lack of oil during pressing. Accordingly, improved press formability of galvanized steel sheets themselves is needed.

As a method of resolving the above-described problems, Patent Literature 1 discloses a technique of enhancing press workability by forming a zinc-based oxide film through electrolytic treatment, immersion treatment, coating/oxidation treatment, or heating treatment of the surface of a galvanized steel sheet.

Patent Literature 2 discloses a technique of enhancing press formability by hot-dip galvanizing a steel sheet, alloying through heating treatment, skin-pass rolling, bringing into contact with an acidic solution that acts as a pH buffer, holding for a predetermined time, and washing with water, thereby forming an oxide layer on a coated surface layer.

Patent Literature 3 discloses a hot-dip galvanized steel sheet having excellent press formability in which an oxide layer has been formed on the coated surface by bringing a hot-dip galvanized steel sheet after skin-pass rolling into contact with an acidic solution that acts as a pH buffer, holding for a predetermined time such that a liquid film of the acidic solution is formed on the steel sheet surface, washing with water, and drying.

Patent Literature 4 discloses an electrogalvanized steel sheet having excellent press formability in which an electrogalvanized steel sheet has been brought into contact with an acidic solution that acts as a pH buffer or with an acidic zinc electroplating bath, held for a predetermined time, washed with water, and dried to form Zn oxide on the coated surface.

There is a manufacturing method for a galvanized steel sheet in which an oxide layer and/or a hydroxide layer are formed on the surface by bringing a galvanized steel sheet into contact with an acidic solution, holding for a predetermined time, washing with water, and drying. In such a method, Patent Literature 5 discloses a technique of achieving excellent press formability by incorporating an oxide colloid into the acidic solution.

Further, the inventors proposed a technique of achieving notably more excellent press formability than ever before by bringing a galvanized steel sheet into contact with an acidic solution containing a fluororesin, holding for a predetermined time, washing with water, and drying, thereby forming, on the surface, an oxide layer and/or a hydroxide layer containing the fluororesin (Patent Literature 6).

CITATION LIST

Patent Literature

PTL 1: Japanese Unexamined Patent Application Publication No. 2-190483
PTL 2: Japanese Patent No. 3807341
PTL 3: Japanese Patent No. 4329387
PTL 4: Japanese Unexamined Patent Application Publication No. 2005-248262
PTL 5: Japanese Patent No. 5386842
PTL 6: Japanese Unexamined Patent Application Publication No. 2016-098380

SUMMARY

Technical Problem

When the techniques disclosed in Patent Literature 1 to 5 described above are employed, good press formability can be achieved compared with common galvanized steel sheets. In recent years, however, high-strength galvanized steel sheets have been widely used in view of weight reduction of automobile bodies. Accordingly, there is a need for better press formability than ever before.

Moreover, further enhanced press formability is required for relatively low-strength galvanized steel sheets to enable more complex forming.

However, when the techniques disclosed in Patent Literature 1 to 5 described above are applied to a high-strength galvanized steel sheet, satisfactory effects cannot necessarily be obtained. In addition, when applied to a relatively low-strength galvanized steel sheet, these techniques are insufficient to enable complex forming.

In the technique disclosed in Patent Literature 6, hazardous fumes may be generated during welding in some cases since a fluororesin is contained in a film.

Accordingly, it is required to take measures against fumes.

The disclosed embodiments were made in view of the above, and an object of the disclosed embodiments is to provide, to a high-strength galvanized steel sheet and a relatively low-strength galvanized steel sheet that undergoes complex forming, a galvanized steel sheet that exhibits consistently excellent press formability and that generates no hazardous fumes during welding as well as a manufacturing method therefor.

Solution to Problem

The inventors continued vigorous investigations to resolve the above-described problems and as a result, found that these problems can be resolved by forming, on the surface of a galvanized steel sheet, an oxide layer having an average thickness of 20 nm or more and containing Zn, S, and polyethylene particles.

The disclosed embodiments were accomplished on the basis of the foregoing findings and are summarized as follows.

[1] A galvanized steel sheet having an oxide layer on a surface of a galvanized steel sheet, where: the oxide layer has an average thickness of 20 nm or more; and the oxide layer contains 30 mg/m$^2$ or more of Zn, 1.0 mg/m$^2$ or more of S, and 50 mg/m$^2$ or more and 1,000 mg/m$^2$ or less of polyethylene particles having an average particle size of 5.0 µm or less.

[2] The galvanized steel sheet according to [1] above, where a sulfate group and a hydroxy group exist in the oxide layer.

[3] The galvanized steel sheet according to [1] or [2] above, where the oxide layer further contains 0.2 mg/m$^2$ or more and 10 mg/m$^2$ or less of P.

[4] The galvanized steel sheet according to any one of [1] to [3] above, where the galvanized steel sheet is any of a galvannealed steel sheet, a hot-dip galvanized steel sheet, and an electrogalvanized steel sheet.

[5] A manufacturing method for the galvanized steel sheet according to any one of [1] to [4] above, including bringing a galvanized steel sheet into contact with an acidic solution containing 3 g/L or more of sulfate ions, 3 g/L or more of Zn ions, and 0.10 g/L or more of polyethylene particles.

[6] The manufacturing method for the galvanized steel sheet according to [5] above, where the acidic solution has a pH of 2 to 6 and a temperature of 20° C. to 80° C.

[7] The manufacturing method for the galvanized steel sheet according to [5] or [6] above, where the acidic solution contains an oxidizing agent.

[8] The manufacturing method for the galvanized steel sheet according to any one of [5] to [7] above, where a contact time between the galvanized steel sheet and the acidic solution is 1 second or more and 500 seconds or less.

[9] The manufacturing method for the galvanized steel sheet according to any one of [5] to [8] above, further including, after bringing into contact with the acidic solution, bringing the galvanized steel sheet into contact with a solution containing 0.01 g/L or more of P ions.

In the disclosed embodiments, the term "galvanized steel sheet" collectively refers to a steel sheet coated with zinc by various manufacturing methods, such as hot-dip coating, electroplating, vapor deposition coating, and thermal spraying. Here, such galvanized steel sheets include both a hot-dip galvanized steel sheet (GI) that has not underwent alloying treatment and a galvannealed steel sheet (GA) that has underwent alloying treatment. Further, any publicly known zinc-containing galvanized layer can be employed as a galvanized layer to be formed on a steel sheet surface. Examples include, but are not limited to, a hot-dip galvanized layer, a galvannealed layer, a hot-dip zinc-aluminum alloy coated layer, a hot-dip zinc-aluminum-magnesium alloy coated layer, an electrogalvanized layer, and a zinc-nickel alloy electroplated layer.

Advantageous Effects

According to the disclosed embodiments, a galvanized steel sheet that exhibits low sliding resistance during press forming and thus excellent press formability can be obtained.

Since the friction coefficient between a galvanized steel sheet and a die or the like is significantly lowered, consistently excellent press formability is imparted to a high-strength galvanized steel sheet as well as to a relatively low-strength galvanized steel sheet that undergoes complex forming. Even during difficult forming, such as deep drawing, required for complex shaping of back doors and the like, sliding resistance is low at a site having a risk of fracture during press forming and thus stretch formability is satisfactory.

Moreover, there is no concern that hazardous fumes may be generated during welding since fluororesins are absent.

In the foregoing, the term "high strength" is assumed to be a tensile strength (TS) of 440 MPa or higher, and the term "relatively low strength" is assumed to be a TS of lower than 440 MPa.

DETAILED DESCRIPTION

Hereinafter, the disclosed embodiments will be described.

The disclosed embodiments are characterized by having an oxide layer on the surface of a galvanized steel sheet that includes a steel sheet and a galvanized layer formed on the steel sheet, where: the oxide layer has an average thickness of 20 nm or more; and the oxide layer contains 30 mg/m$^2$ or more of Zn, 1.0 mg/m$^2$ or more of S, and 50 mg/m$^2$ or more and 1,000 mg/m$^2$ or less of polyethylene particles having an average particle size of 5.0 µm or less.

The lubrication mechanism of the oxide layer is unclear but is presumably as follows. During sliding, high contact pressure arises between a die and a galvanized steel sheet, thereby excluding lubricating oil and forming a direct contact portion between the die and a galvanized layer. In addition, due to an adhesion force between the die and the galvanized layer, shear stress arises on the surface of the galvanized layer. In such a case, Zn-containing oxide is capable of suppressing adhesion, specifically suppressing direct contact between the die and the steel sheet. Meanwhile, S is an element used as an extreme pressure additive. S is also capable of suppressing adhesion, specifically suppressing adhesion between the steel sheet and the die through adsorption onto the galvanized steel sheet surface or the die even under high contact pressure conditions in which oil is excluded. Further, by incorporating polyethylene particles into the oxide layer, the polyethylene particles partially play a role in sliding between the die and the steel sheet, thereby significantly lowering a friction coefficient. Due to these synergistic effects, excellent press formability can presumably be exhibited even under high contact pressure conditions during press forming of a high-strength steel sheet and during complex forming of a relatively low-strength steel sheet.

Zn content and S content in the oxide layer are 30 mg/m$^2$ or more and 1.0 mg/m$^2$ or more, respectively. When Zn content is less than 30 mg/m$^2$ and/or S content is less than 1.0 mg/m$^2$ in the oxide layer, it is difficult to obtain a satisfactory effect of enhancing sliding properties, in other words, an effect of enhancing press formability. Meanwhile, when Zn content exceeds 1,000 mg/m$^2$ and/or S content exceeds 100 mg/m$^2$, spot weldability and/or chemical conversion processability, which are important in automobile manufacture, deteriorate in some cases. Accordingly, Zn content and S content are preferably 1,000 mg/m$^2$ or less and 100 mg/m$^2$ or less, respectively.

The average thickness of the oxide layer is set to 20 nm or more. When the average thickness is less than 20 nm, satisfactory press formability cannot be achieved. Meanwhile, when the average thickness exceeds 200 nm, surface reactivity decreases excessively and as a result, formation of a chemical conversion coating becomes difficult in some cases. Accordingly, the average thickness of the oxide layer is preferably 200 nm or less.

In the disclosed embodiments, the oxide layer contains polyethylene particles as a solid lubricant. Polyethylene is widely used and inexpensive. In addition, a satisfactory effect of enhancing sliding properties is obtained by incorporating polyethylene particles into the oxide layer. Meanwhile, when a fluororesin is contained, the fluororesin thermally decomposes during welding, and there is a possibility of generating a hazardous gas, such as HF or PFIB. In the disclosed embodiments, in contrast, only C and H are contained in the molecule. Accordingly, there is no concern that hazardous fumes or a hazardous gas may be generated during welding. Moreover, since an organic resin is used in the disclosed embodiments, a satisfactory effect of enhancing sliding properties is obtained compared with inorganic solid lubricants, such as molybdenum disulfide and boron nitride.

To efficiently incorporate polyethylene particles into the oxide layer, the average particle size is set to 5.0 µm or less. When the average particle size exceeds 5.0 µm, polyethylene particles are less likely to be incorporated into the oxide layer. In addition, adhesion with the oxide layer tends to deteriorate. As a preferable average particle size, the lower limit is 0.1 µm, and the upper limit is 1.0 µm.

The content of polyethylene (PE) is set to 50 mg/m$^2$ or more and 1,000 mg/m$^2$ or less in total. When the content is less than 50 mg/m$^2$, a satisfactory lubricating effect cannot be exerted. Meanwhile, when the content exceeds 1,000 mg/m$^2$, spot weldability and/or chemical conversion processability deteriorate. The content is preferably 50 mg/m$^2$ or more and 400 mg/m$^2$ or less.

The oxide layer formed on the surface of a galvanized steel sheet in the disclosed embodiments can be analyzed by the following method.

Zn content and S content in the oxide layer can be quantified by analyzing, using an ICP atomic emission spectrometer, a solution of 2% by mass of ammonium dichromate+14% by mass of ammonia water in which the oxide layer is dissolved.

The thickness of the oxide layer can be determined by measuring oxygen intensity by using X-ray fluorescence and converting the obtained oxygen intensity into the thickness of a silica film by using, as criteria, the values for a silicon wafer on which silicon oxide films of known thicknesses have been formed. An average of thus-determined values is regarded as the average thickness of the oxide layer.

The existence modes of Zn, S, and O can be analyzed by using an X-ray photoelectron spectrometer.

Regarding polyethylene particles in the oxide layer, the average particle size can be determined by measuring the particle size for optional 20 polyethylene particles in an observed SEM image and averaging the measured values. The content can be calculated by measuring the number of polyethylene particles that exist in a certain area and multiplying the total volume by the density.

In view of the stability of the oxide layer, a sulfate group and a hydroxy group preferably exist in the oxide layer. The presence or the absence of a sulfate group and a hydroxy group can be confirmed by the method in the Examples section described hereinafter.

Moreover, in the disclosed embodiments, the oxide layer preferably further contains 0.2 mg/m$^2$ or more and 10 mg/m$^2$ or less of P. By incorporating P into the oxide layer, degreasing properties, that is, removal of oil attached to a steel sheet surface, can be enhanced in a degreasing step in automobile manufacture. When P is not contained in the oxide layer and when a degreasing solution deteriorates or the amount of oil applied to a steel sheet is excessive, oil cannot be removed satisfactorily in a degreasing step, thereby causing water repellency. Consequently, later steps, such as chemical conversion treatment and coating, may be adversely affected. Meanwhile, it is considered that P is attached to the surface in the form of a phosphate compound and that the OH groups present in the phosphate compound increase water affinity, thereby enhancing water wettability. When P content is less than 0.2 mg/m$^2$, a satisfactory effect of enhancing degreasing properties cannot be obtained in some cases. Meanwhile, when P content exceeds 10 mg/m$^2$, there is a concern that spot weldability, which is important in automobile manufacture, may deteriorate.

P content in the oxide layer can be determined by analyzing, using an ICP atomic emission spectrometer, a solution of 2% by mass of ammonium dichromate+14% by mass of ammonia water in which the oxide layer is dissolved and by converting the measured value into content per unit area.

A manufacturing method for a galvanized steel sheet of the disclosed embodiments will be described.

First, a steel sheet is subjected to a galvanizing process. A method for the galvanizing process is not particularly limited, and a common method, such as hot-dip galvanizing or electrogalvanizing, can be employed. Moreover, conditions for the galvanizing process are not particularly limited, and preferable conditions may be employed appropriately. Further, alloying treatment may be performed after galvanizing. Here, a method for the alloying treatment is not particularly limited, and a common method can be employed.

Subsequently, an oxide layer having an average thickness of 20 nm or more and containing 30 mg/m$^2$ or more of Zn, 1.0 mg/m$^2$ or more of S, and 50 mg/m$^2$ or more and 1,000 mg/m$^2$ or less of polyethylene particles having an average particle size of 5.0 µm or less is formed on the surface of a galvanized steel sheet.

Exemplary forming methods for the oxide layer include a method of bringing a galvanized steel sheet into contact with an acidic solution containing sulfate ions, Zn ions, and polyethylene particles, followed by water washing. Here, drying may be performed as necessary after water washing. Specifically, a steel sheet is brought into contact with an acidic solution containing 3 g/L or more of sulfate ions, 3 g/L or more of Zn ions, and 0.10 g/L or more of polyethylene particles, followed by water washing. Regarding polyethylene particles having an average particle size of 5.0 µm or less to be used, the manufacturing method is not particularly limited. Polyethylene products having an average particle size of 5.0 µm or less may also be used. The acidic solution preferably has a pH of 2 to 6. When the pH is less than 2, dissolution of a galvanized layer is severe and formation of the oxide layer is suppressed in some cases. Meanwhile, an acidic solution having a pH exceeding 6 is not preferable since Zn ions in the solution precipitate to form sludge in some cases. In addition, oxide is not formed sufficiently in some cases. Accordingly, the acidic solution preferably has a pH of 2 or more and 6 or less.

The acidic solution preferably has a temperature of 20° C. to 80° C. When the temperature is lower than 20° C., the formation rate of the oxide layer is slow. Meanwhile, a temperature exceeding 80° C. is not preferable since the evaporation amount of the solution increases, the solution concentration becomes difficult to control, and increased costs result.

The contact time with the acidic solution is preferably 1 second or more and 500 seconds or less. When the contact time is less than 1 second, a film having a sufficient thickness cannot be obtained in some cases. Meanwhile, when the contact time exceeds 500 seconds, the process time increases, thereby increasing production costs.

The acidic solution preferably contains an oxidizing agent. Examples of the oxidizing agent include nitric acid, nitrate salts, such as sodium nitrate, hydrogen peroxide, and potassium permanganate. By incorporating an oxidizing agent into the acidic solution, formation of the oxide layer is promoted, thereby enabling rapid formation of the oxide layer.

The formation mechanism of the oxide layer containing Zn, S, and polyethylene particles is unclear but is presumably as follows. When a galvanized layer-covered steel sheet is brought into contact with an acidic solution containing sulfate ions, Zn ions, and polyethylene particles, in the steel side, dissolution reactions of zinc occur and hydrogen is generated due to hydrogen ion reduction, thereby increasing the pH on the steel sheet surface. At this moment, if sulfate ions and Zn ions exist in the solution near the pH-increased steel sheet surface, Zn, O, and S are precipitated/deposited in compound form. At the same time, if polyethylene particles exist in the solution near the steel sheet, the polyethylene particles are incorporated into the compounds of Zn, O, and S. As a result, the above-described oxide layer is presumably formed.

In view of the above-described formation mechanism, a solution to be brought into contact with a steel sheet preferably contains 3 g/L or more of sulfate ions, 3 g/L or more of Zn ions, and 0.10 g/L or more of polyethylene particles. When sulfate ions and Zn ions are each less than 3 g/L, formation of an oxide layer having a sufficient thickness becomes difficult in some cases due to a slow deposition rate. When polyethylene particles are less than 0.10 g/L, the amount incorporated into the oxide layer may be decreased. Meanwhile, even when sulfate ions are 170 g/L or more, Zn ions are 120 g/L or more, and/or polyethylene particles are 100 g/L or more, a further increased deposition rate cannot be expected. Accordingly, in view of balancing with costs, sulfate ions are preferably less than 170 g/L, Zn ions are preferably less than 120 g/L, and polyethylene particles are preferably less than 100 g/L.

A method of bringing the steel sheet into contact with the acidic solution is not particularly limited, and examples include a method of allowing contact by immersing a steel sheet in an acidic solution, a method of allowing contact by spraying an acidic solution onto a steel sheet, and a method of applying an acidic solution to a steel sheet by using a coating roll.

Water washing is performed after contact with an acidic solution. Subsequently, drying is performed as necessary. Methods for water washing and drying are not particularly limited, and common methods can be employed.

Furthermore, when the oxide layer further contains P in a content of 0.2 mg/m$^2$ or more and 10 mg/m$^2$ or less, a steel sheet is brought into contact with a solution containing 0.01 g/L or more of P ions after water washing and, if necessary, drying. By bringing a steel sheet into contact with a solution containing P after water washing and drying, a P-based compound is incorporated into the oxide layer through substitution reactions of the P-based compound with an S-based compound in the compounds containing Zn, S, and O. When the concentration of P ions in a solution to be brought into contact is excessively low, satisfactory effects may not be obtained due to a decreased substitution rate. Accordingly, the concentration of P ions is preferably 0.01 g/L or more. Meanwhile, when the concentration of P ions is 100 g/L or more, a further increased deposition rate cannot be expected. In view of balancing with costs, the concentration of P ions is preferably less than 100 g/L. As the solution containing P ions, an aqueous solution of sodium polyphosphate, sodium pyrophosphate, or sodium phosphate, for example, may be used. Since similar effects are exerted as long as P ions are contained, chemicals to be used are not particularly specified.

Here, even if N, Pb, Na, Mn, Ba, Sr, Si, Zr, Al, Sn, Cu, Be, B, F, and/or Ne, for example, are incorporated into the oxide layer due to impurities contained in the solution, the effects of the disclosed embodiments are not impaired.

Examples

Hereinafter, the disclosed embodiments will be described with reference to the Examples. The disclosed embodiments, however, are not intended to be limited to the following Examples.

Each 1.2 mm-thick high-strength cold-rolled steel sheet (TS: 590 MPa) was subjected to electrogalvanizing (EG), hot-dip galvanizing (GI), or alloying (GA) after hot-dip galvanizing. Subsequently, the steel sheet was immersed, under the conditions shown in Table 1, in an acidic solution adjusted to the conditions shown in Table 1. The steel sheet was then washed with water and dried. Some of such steel sheets were further immersed in a solution of sodium pyrophosphate decahydrate under the conditions of the concentration, the temperature, and the immersion time shown in Table 1. After that, these steel sheets were thoroughly washed with water and dried to incorporate 0.2 mg/m$^2$ or more and 10 mg/m$^2$ or less of P into the oxide layer.

For the thus-obtained high-strength cold-rolled steel sheets, Zn content, S content, P content, and polyethylene particle content in the surface oxide layer as well as the average thickness of the oxide layer were measured. In addition, the presence or the absence of a hydroxy group and a sulfate group was confirmed. Moreover, sliding properties were evaluated by performing friction coefficient measurement as a technique for assessing press formability. Here, measurement methods for Zn content, S content, P content, and polyethylene particle content in the surface layer of each high-strength cold-rolled steel sheet; a measurement method for the average thickness of the oxide layer; and a measurement method for existence modes of Zn, S, and O (confirmation of the presence or the absence of a hydroxy group and a sulfate group); as well as an evaluation method for press formability (sliding properties) are as follows.

(1) Analysis of Oxide Layer

Measurement of Oxide Layer Average Thickness

An X-ray fluorescence spectrometer was used for measuring the thickness of an oxide layer formed on a galvanized steel sheet. The O-Kα line was detected while setting a tube voltage and current during measurement to 30 kV and 100 mA, respectively as well as an analyzing crystal to TAP. In the measurement of the O-Kα line, the intensity at the background position, in addition to the peak position, was also measured, thereby enabling calculation of the net intensity of the O-Kα line. Here, the integration time at the peak position and at the background position were each set to 20 seconds.

Further, on a sample stage, a silicon wafer that had been cleaved into an appropriate size on which 96 nm-, 54 nm-, and 24 nm-thick silicon oxide films had been formed was placed together with these set of specimens such that the intensity of the O-Kα line can also be calculated from these silicon oxide films. A calibration curve between oxide layer thickness and O-Kα line intensity was drawn by using these data, and the oxide layer thickness of each sample was calculated as an oxide layer thickness in terms of a silicon oxide film. An average of such measured values is regarded as the average thickness of an oxide layer.

Composition Analysis of Oxide Layer

Only the oxide layer was dissolved by using a solution of 2% of ammonium dichromate+14% by mass of ammonia water, and the resulting solution was subjected to quantitative analysis of Zn, S, and P by using an ICP atomic emission spectrometer.

The measured value was converted into the content per unit area and the resulting value is regarded as the content.

Analysis of Polyethylene Particle Content

The average particle size and the number of polyethylene particles were determined by observing randomly extracted five fields of view under a scanning electron microscope at an accelerating voltage of 5 kV, a working distance of 8.5 mm, and a magnification of 5,000×. The content of polyethylene particles was determined by obtaining the total volume of polyethylene particles per unit area in each observed field of view, calculating the content through multiplication of the total volume by the density, and obtaining an average of the five fields of view.

Existence Modes of Zn, S, and O (Presence or Absence of Hydroxy Group and Sulfate Group)

Existence modes of Zn, S, and O were analyzed by using an X-ray photoelectron spectrometer. Measurement of narrow-scan spectra of Zn LMM and S 2p was performed by using a monochromatic Al Kα X-ray source.

(2) Evaluation Method of Press Formability (Sliding Properties)

To evaluate press formability, the friction coefficient of each sample was measured as follows.

Figure 1:
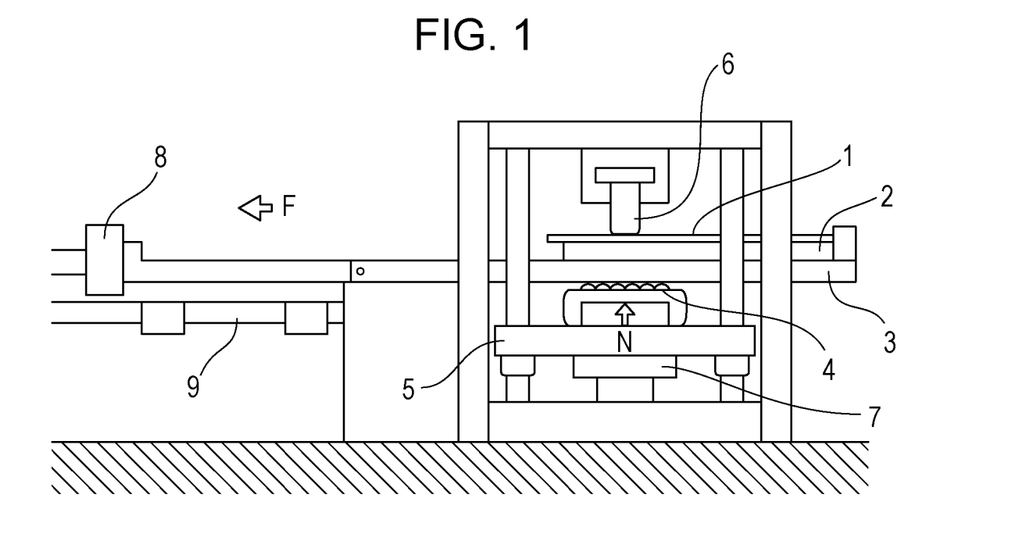
FIG. 1 is a schematic front view of a measuring device for friction coefficients.

FIG. 1 is a schematic front view of a measuring device for friction coefficients. As shown in the figure, a specimen 1 for friction coefficient measurement taken from a sample is fixed to a sample mount 2. This sample mount 2, in turn, is fixed to an upper surface of a horizontally-movable sliding table 3. On a lower surface of the sliding table 3, a vertically-movable sliding table support 5 having a roller 4 in contact with the lower surface is provided. A first load cell 7, which measures pressure load N against the specimen 1 for friction coefficient measurement by pressing the sliding table support 5 upward, is fixed to the sliding table support 5. A second load cell 8, which measures sliding resistance force F for horizontally moving the sliding table 3 while the pressure force is exerted, is fixed at one end of the sliding table 3. A test was performed after applying a "PRETON R 352L" cleaning oil for pressing from Sugimura Chemical Industrial Co., Ltd. as a lubricating oil to the surface of the specimen 1.

Figure 2:
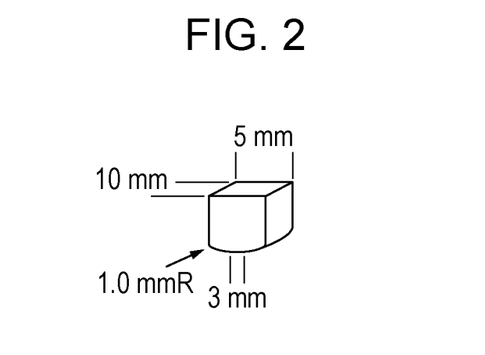
FIG. 2 is a schematic perspective view illustrating the shape and size of the bead in FIG. 1.
Figure 3:
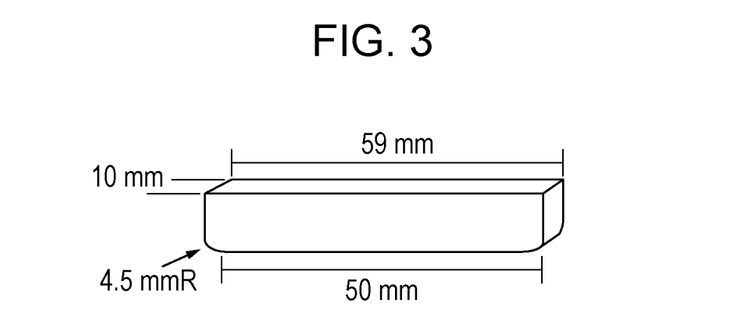
FIG. 3 is a schematic perspective view illustrating the shape and size of the bead in FIG. 1.

FIGS. 2 and 3 are each a schematic perspective view illustrating the shape and size of a bead used. The specimen 1 slides while the lower surface of the bead 6 is pressed against the surface of the specimen 1. The bead 6 illustrated in FIG. 2 has the shape of 10 mm-width and 5 mm-length in the sliding direction of a specimen; a lower portion at both edges in the sliding direction formed with a curved surface of 1.0 mmR-curvature; and a bead lower surface, against which the specimen is pressed, having a plane of 10 mm-width and 3 mm-length in the sliding direction. The bead 6 illustrated in FIG. 3 has the shape of 10 mm-width and 59 mm-length in the sliding direction of a specimen; a lower portion at both edges in the sliding direction formed with a curved surface of 4.5 mmR-curvature; and a bead lower surface, against which the specimen is pressed, having a plane of 10 mm-width and 50 mm-length in the sliding direction.

A friction coefficient measurement test was performed under the following two sets of conditions.

[Conditions 1]

The bead illustrated in FIG. 2 was used at a pressure load N of 400 kgf and a pulling speed of a specimen (horizontal moving rate of the sliding table 3) of 100 cm/min.

[Conditions 2]

The bead illustrated in FIG. 3 was used at a pressure load N of 400 kgf and a pulling speed of a specimen (horizontal moving rate of the sliding table 3) of 20 cm/min.

A friction coefficient μ between a sample and the bead was calculated according to the equation of μ=F/N.

(3) Evaluation Method of Degreasing Properties

Some of the steel sheets were evaluated for degreasing properties. Degreasing properties were evaluated as water wettability after degreasing. A prepared test piece was coated with a PRETON R 352L cleaning oil for pressing from Sugimura Chemical Industrial Co., Ltd. at 2.0 g/m$^2$ per surface and then degreased by using a FC-E6403 alkaline degreasing solution from Nihon Parkerizing Co., Ltd. By adding 10 g/L of a PRETON R 352L cleaning oil for pressing from Sugimura Chemical Industrial Co., Ltd. to the degreasing solution in advance, degradation of the alkaline degreasing solution in the automobile production line was simulated. Here, the degreasing time was set to 60 seconds and the temperature was set to 37° C. During degreasing, the degreasing solution was stirred with a 10 cm-diameter impeller at a rate of 150 rpm. Degreasing properties were evaluated by measuring water wettability of a test piece 20 seconds after completion of degreasing.

The results obtained as in the foregoing are shown in Table 2.

TABLE 1

| No. | Sample | Acidic solution | | | | | | | | | | P ion solution | | | |
|---|---|---|---|---|---|---|---|---|---|---|---|---|---|---|---|
| | | Sulfate ion and Zn ion | | Oxidizing agent | | Solid lubricant | | | pH | Temperature (°C) | Immersion time (second) | Chemical species | P ion Concentration (g/L) | Temperature (°C) | Immersion time (second) |
| | | Chemical species | Concentration (g/L) | Chemical species | Concentration (g/L) | Chemical species | Average particle size (μm) | Concentration (g/L) | | | | | | | |
| 1 | EG | Untreated | | | | | | | | | | — | — | — | — |
| 2 | | Zinc sulfate heptahydrate | 20 | — | — | — | — | — | 4.5 | 60 | 10 | — | — | — | — |
| 3 | | Zinc sulfate heptahydrate | 20 | — | — | — | — | — | 4.5 | 60 | 60 | — | — | — | — |
| 4 | | Zinc sulfate heptahydrate | 20 | — | — | — | — | — | 4.5 | 60 | 120 | — | — | — | — |
| 5 | | Zinc sulfate heptahydrate | 20 | Sodium nitrate | 1 | — | — | — | 4.5 | 60 | 1 | — | — | — | — |
| 6 | | Zinc sulfate heptahydrate | 20 | Sodium nitrate | 1 | — | — | — | 4.5 | 60 | 5 | — | — | — | — |
| 7 | | Zinc sulfate heptahydrate | 20 | Sodium nitrate | 1 | — | — | — | 4.5 | 60 | 10 | — | — | — | — |
| 8 | | Zinc sulfate heptahydrate | 20 | — | — | PE | 0.6 | 20 | 4.5 | 60 | 10 | — | — | — | — |
| 9 | | Zinc sulfate heptahydrate | 20 | — | — | PE | 0.6 | 20 | 4.5 | 60 | 60 | — | — | — | — |
| 10 | | Zinc sulfate heptahydrate | 20 | — | — | PE | 0.6 | 20 | 4.5 | 60 | 120 | — | — | — | — |
| 11 | | Zinc sulfate heptahydrate | 20 | Sodium nitrate | 1 | PE | 0.6 | 20 | 4.5 | 60 | 1 | — | — | — | — |
| 12 | | Zinc sulfate heptahydrate | 20 | Sodium nitrate | 1 | PE | 0.6 | 20 | 4.5 | 60 | 5 | — | — | — | — |
| 13 | | Zinc sulfate heptahydrate | 20 | Sodium nitrate | 1 | PE | 0.6 | 20 | 4.5 | 60 | 10 | — | — | — | — |
| 14 | | | | Hydrogen peroxide | 0.3 | PE | 0.6 | 20 | 4.5 | 60 | 5 | — | — | — | — |
| 15 | | | | Potassium permanganate | 0.3 | PE | 0.6 | 20 | 4.5 | 60 | 5 | — | — | — | — |
| 16 | | Zinc sulfate heptahydrate | 20 | Sodium nitrate | 1 | PE | 0.6 | 0.05 | 4.5 | 60 | 5 | — | — | — | — |
| 17 | | Zinc sulfate heptahydrate | 20 | Sodium nitrate | 1 | PE | 0.6 | 1 | 4.5 | 60 | 5 | — | — | — | — |
| 18 | | Zinc sulfate heptahydrate | 20 | Sodium nitrate | 1 | PE | 0.6 | 5 | 4.5 | 60 | 5 | — | — | — | — |
| 19 | | Zinc sulfate heptahydrate | 20 | Sodium nitrate | 1 | PE | 0.6 | 20 | 4.5 | 60 | 5 | — | — | — | — |
| 20 | | Zinc sulfate heptahydrate | 20 | Sodium nitrate | 1 | PE | 0.6 | 50 | 4.5 | 60 | 5 | — | — | — | — |
| 21 | | Zinc sulfate heptahydrate | 0 | Sodium nitrate | 1 | PE | 0.6 | 20 | 4.5 | 60 | 5 | — | — | — | — |
| 22 | | Zinc sulfate heptahydrate | 50 | Sodium nitrate | 1 | PE | 0.6 | 20 | 4.5 | 60 | 5 | — | — | — | — |
| 23 | | Zinc sulfate heptahydrate | 90 | Sodium nitrate | 1 | PE | 0.6 | 20 | 4.5 | 60 | 5 | — | — | — | — |
| 24 | | Zinc sulfate heptahydrate | 20 | Sodium nitrate | 1 | PE | 0.6 | 20 | 4.5 | 10 | 5 | — | — | — | — |
| 25 | | Zinc sulfate heptahydrate | 20 | Sodium nitrate | 1 | PE | 0.6 | 20 | 4.5 | 20 | 5 | — | — | — | — |
| 26 | | Zinc sulfate heptahydrate | 20 | Sodium nitrate | 1 | PE | 0.6 | 20 | 4.5 | 40 | 5 | — | — | — | — |
| 27 | | Zinc sulfate heptahydrate | 20 | Sodium nitrate | 1 | PE | 0.6 | 20 | 4.5 | 80 | 5 | — | — | — | — |
| 28 | | Zinc sulfate heptahydrate | 20 | Sodium nitrate | 1 | PE | 0.6 | 20 | 1 | 60 | 5 | — | — | — | — |
| 29 | | Zinc sulfate heptahydrate | 20 | Sodium nitrate | 1 | PE | 0.6 | 20 | 2 | 60 | 5 | — | — | — | — |
| 30 | | Zinc sulfate heptahydrate | 20 | Sodium nitrate | 1 | PE | 0.6 | 20 | 4 | 60 | 5 | — | — | — | — |
| 31 | | Zinc sulfate heptahydrate | 20 | Sodium nitrate | 1 | PE | 0.6 | 20 | 6 | 60 | 5 | — | — | — | — |
| 32 | | Zinc sulfate heptahydrate | 20 | Sodium nitrate | 1 | PE | 0.6 | 20 | 7 | 60 | 5 | — | — | — | — |
| 33 | | Zinc sulfate heptahydrate | 20 | Sodium nitrate | 1 | PE | 0.6 | 20 | 4.5 | 60 | 30 | — | — | — | — |
| 34 | | Zinc sulfate heptahydrate | 20 | Sodium nitrate | 1 | PE | 1 | 20 | 4.5 | 60 | | — | — | — | — |
| 35 | | Zinc sulfate heptahydrate | 20 | Sodium nitrate | 1 | PE | 5 | 20 | 4.5 | 60 | | — | — | — | — |
| 36 | | Zinc sulfate heptahydrate | 20 | Sodium nitrate | 1 | PE | 10 | 20 | 4.5 | 60 | | — | — | — | — |
| 37 | GI | Zinc sulfate heptahydrate | 20 | Sodium nitrate | 1 | — | — | — | 4.5 | 60 | 60 | — | — | — | — |
| 38 | | | | | | — | — | — | | | 5 | — | — | — | — |
| 39 | | | | | | PE | 0.6 | 0.05 | | | 5 | — | — | — | — |
| 40 | | | | | | PE | | 1 | | | 5 | — | — | — | — |
| 41 | | | | | | PE | | 5 | | | 5 | — | — | — | — |

TABLE 1-continued

| | | Acidic solution | | | | | | | | | | P ion solution | | | |
|---|---|---|---|---|---|---|---|---|---|---|---|---|---|---|---|
| | | Sulfate ion and Zn ion | | Oxidizing agent | | Solid lubricant | | | | | Immersion | P ion | | | |
| No. | Sample | Chemical species | Concentration (g/L) | Chemical species | Concentration (g/L) | Chemical species | Average particle size (μm) | Concentration (g/L) | pH | Temperature (°C) | time (second) | Chemical species | Concentration (g/L) | Temperature (°C) | Immersion time (second) |
| 42 | | | | | | | | 20 | | | 5 | — | — | — | — |
| 43 | | | | | | | | 50 | | | 5 | — | — | — | — |
| 44 | GA | Zinc sulfate heptahydrate | 20 | — | | — | | — | 4.5 | 60 | 60 | — | — | — | — |
| 45 | | | | Sodium nitrate | 1 | — | | — | | | 5 | — | — | — | — |
| 46 | | | | | | PE | 0.6 | 0.05 | | | 5 | — | — | — | — |
| 47 | | | | | | | | 1 | | | 5 | — | — | — | — |
| 48 | | | | | | | | 5 | | | 5 | — | — | — | — |
| 49 | | | | | | | | 20 | | | 5 | — | — | — | — |
| 50 | | | | | | | | 50 | | | 5 | — | — | — | — |
| 51 | EG | Zinc sulfate heptahydrate | 20 | Sodium nitrate | 1 | PE | 0.6 | 20 | 4.5 | 60 | 5 | Sodium pyrophosphate decahydrate | 0.1 | 50 | 3 |
| 52 | | | | | | | | | | | | | 1 | | 3 |
| 53 | | | | | | | | | | | | | 10 | | 3 |

TABLE 2

| | | Oxide layer analysis results | | | | | | | Press formability Friction coefficient | | Alkaline degreasing properties Water wettability after degreasing | |
|---|---|---|---|---|---|---|---|---|---|---|---|---|
| No. | Average thickness (○) (nm) | Zn content (mg/m²) | S content (mg/m²) | Presence of hydroxy group | Presence of sulfate group | Polyethylene particle content (mg/m²) | Treatment with P solution | P content (mg/m²) | Conditions 1 | Conditions 2 | (%) | Note |
| 1 | 5 | 0 | 0.0 | X | X | 0 | None | — | 0.206 | 0.270 | 100 | Comparative Example |
| 2 | 24 | 57 | 5.9 | ○ | ○ | 0 | None | — | 0.129 | 0.175 | 90 | Comparative Example |
| 3 | 60 | 160 | 15.5 | ○ | ○ | 0 | None | — | 0.124 | 0.173 | 80 | Comparative Example |
| 4 | 83 | 224 | 21.0 | ○ | ○ | 0 | None | — | 0.135 | 0.175 | 80 | Comparative Example |
| 5 | 32 | 78 | 7.2 | ○ | ○ | 0 | None | — | 0.125 | 0.174 | 80 | Comparative Example |
| 6 | 51 | 135 | 13.5 | ○ | ○ | 0 | None | — | 0.122 | 0.170 | 80 | Comparative Example |
| 7 | 72 | 197 | 18.9 | ○ | ○ | 0 | None | — | 0.131 | 0.169 | 80 | Comparative Example |
| 8 | 22 | 54 | 5.1 | ○ | ○ | 186 | None | — | 0.101 | 0.128 | 90 | Example |
| 9 | 54 | 153 | 15.3 | ○ | ○ | 359 | None | — | 0.074 | 0.108 | 80 | Example |
| 10 | 78 | 216 | 19.6 | ○ | ○ | 465 | None | — | 0.070 | 0.094 | 80 | Example |
| 11 | 30 | 70 | 7.3 | ○ | ○ | 230 | None | — | 0.099 | 0.124 | 80 | Example |
| 12 | 49 | 125 | 12.3 | ○ | ○ | 325 | None | — | 0.077 | 0.112 | 80 | Example |
| 13 | 69 | 185 | 17.9 | ○ | ○ | 425 | None | — | 0.069 | 0.087 | 80 | Example |
| 14 | 50 | 130 | 12.8 | ○ | ○ | 330 | None | — | 0.080 | 0.115 | 80 | Example |
| 15 | 45 | 121 | 11.4 | ○ | ○ | 305 | None | — | 0.081 | 0.114 | 80 | Example |
| 16 | 53 | 140 | 13.4 | ○ | ○ | 26 | None | — | 0.110 | 0.135 | 80 | Comparative Example |
| 17 | 50 | 130 | 12.7 | ○ | ○ | 75 | None | — | 0.104 | 0.124 | 80 | Example |
| 18 | 51 | 140 | 13.0 | ○ | ○ | 143 | None | — | 0.094 | 0.122 | 80 | Example |
| 19 | 46 | 135 | 11.7 | ○ | ○ | 310 | None | — | 0.083 | 0.111 | 80 | Example |
| 20 | 40 | 109 | 9.9 | ○ | ○ | 549 | None | — | 0.066 | 0.085 | 80 | Example |
| 21 | 18 | 42 | 4.0 | ○ | ○ | 38 | None | — | 0.125 | 0.165 | 90 | Comparative Example |
| 22 | 55 | 148 | 14.0 | ○ | ○ | 355 | None | — | 0.076 | 0.107 | 80 | Example |
| 23 | 60 | 164 | 15.4 | ○ | ○ | 380 | None | — | 0.072 | 0.105 | 80 | Example |
| 24 | 20 | 45 | 4.4 | ○ | ○ | 175 | None | — | 0.102 | 0.129 | 90 | Example |
| 25 | 24 | 58 | 5.7 | ○ | ○ | 200 | None | — | 0.113 | 0.126 | 80 | Example |
| 26 | 40 | 108 | 10.0 | ○ | ○ | 280 | None | — | 0.100 | 0.118 | 80 | Example |
| 27 | 64 | 175 | 16.5 | ○ | ○ | 400 | None | — | 0.075 | 0.091 | 80 | Example |
| 28 | 21 | 48 | 5.0 | ○ | ○ | 103 | None | — | 0.101 | 0.129 | 90 | Example |
| 29 | 27 | 70 | 6.4 | ○ | ○ | 215 | None | — | 0.116 | 0.122 | 80 | Example |
| 30 | 42 | 110 | 10.5 | ○ | ○ | 290 | None | — | 0.097 | 0.116 | 80 | Example |
| 31 | 54 | 146 | 13.8 | ○ | ○ | 350 | None | — | 0.081 | 0.107 | 80 | Example |
| 32 | 22 | 51 | 5.3 | ○ | ○ | 113 | None | — | 0.100 | 0.128 | 90 | Example |
| 33 | 51 | 137 | 12.8 | ○ | ○ | 335 | None | — | 0.072 | 0.104 | 80 | Example |
| 34 | 51 | 138 | 13.0 | ○ | ○ | 329 | None | — | 0.073 | 0.101 | 80 | Example |
| 35 | 49 | 131 | 12.4 | ○ | ○ | 235 | None | — | 0.080 | 0.112 | 80 | Example |
| 36 | 50 | 138 | 12.5 | ○ | ○ | 48 | None | — | 0.103 | 0.132 | 80 | Comparative Example |
| 37 | 6 | 0 | 0.0 | ○ | ○ | 0 | None | — | 0.154 | 0.294 | 100 | Comparative Example |
| 38 | 56 | 145 | 14.0 | ○ | ○ | 0 | None | — | 0.129 | 0.174 | 80 | Comparative Example |
| 39 | 55 | 149 | 14.3 | ○ | ○ | 29 | None | — | 0.112 | 0.135 | 80 | Comparative Example |
| 40 | 57 | 160 | 14.5 | ○ | ○ | 80 | None | — | 0.101 | 0.121 | 80 | Example |
| 41 | 55 | 149 | 14.2 | ○ | ○ | 155 | None | — | 0.090 | 0.122 | 80 | Example |
| 42 | 51 | 137 | 13.0 | ○ | ○ | 349 | None | — | 0.085 | 0.115 | 80 | Example |
| 43 | 49 | 129 | 12.5 | ○ | ○ | 540 | None | — | 0.070 | 0.088 | 80 | Example |
| 44 | 8 | 0 | 0.0 | ○ | ○ | 0 | None | — | 0.206 | 0.270 | 100 | Comparative Example |
| 45 | 49 | 130 | 12.4 | ○ | ○ | 0 | None | — | 0.125 | 0.167 | 80 | Comparative Example |
| 46 | 49 | 137 | 12.4 | ○ | ○ | 21 | None | — | 0.118 | 0.134 | 80 | Comparative Example |
| 47 | 47 | 126 | 11.9 | ○ | ○ | 60 | None | — | 0.110 | 0.127 | 80 | Example |
| 48 | 46 | 126 | 11.4 | ○ | ○ | 137 | None | — | 0.101 | 0.126 | 80 | Example |
| 49 | 42 | 111 | 10.3 | ○ | ○ | 319 | None | — | 0.088 | 0.117 | 80 | Example |
| 50 | 39 | 102 | 9.5 | ○ | ○ | 499 | None | — | 0.075 | 0.094 | 80 | Example |

TABLE 2-continued

| | Oxide layer analysis results | | | | | | | | Press formability Friction coefficient | | Alkaline degreasing properties | |
|---|---|---|---|---|---|---|---|---|---|---|---|---|
| No. | Average thickness (○) (nm) | Zn content (mg/m²) | S content (mg/m²) | Presence of hydroxy group | Presence of sulfate group | Polyethylene particle content (mg/m²) | Treatment with P solution | P content (mg/m²) | Conditions 1 | Conditions 2 | Water wettability after degreasing (%) | Note |
| 51 | 49 | 134 | 13.4 | ○ | ○ | 322 | Performed | 1.3 | 0.078 | 0.110 | 100 | Example |
| 52 | 45 | 120 | 12.0 | ○ | ○ | 320 | Performed | 2.4 | 0.080 | 0.113 | 100 | Example |
| 53 | 46 | 122 | 12.3 | ○ | ○ | 317 | Performed | 7.9 | 0.080 | 0.111 | 100 | Example |

\* ○ Presence observed, X Presence unobserved

Tables 1 and 2 reveal the following matters.

No. 8 to 15, 17 to 20, 22 to 35, 40 to 43, and 47 to 53 are Examples. These Examples contain sufficient amounts of Zn, S, and polyethylene particles in the oxide layer and are thus excellent in press formability.

In contrast, Comparative Examples are inferior in press formability.

Detailed analysis of the oxide layer was performed for No. 12. As a result of the analysis by using an X-ray photoelectron spectrometer, a peak corresponding to Zn LMM was observed near 987 eV, thereby revealing that Zn exists in the form of zinc hydroxide. Similarly, a peak corresponding to S 2p was observed near 171 eV, thereby revealing that S exists as a sulfate salt. Through the same procedure, other Examples were also investigated whether zinc hydroxide and a sulfate salt were contained. The investigation results are shown in Table 2 as 0 for those with observed existence and inclusion and x for unobserved ones. Similar to No. 12, Examples are revealed to contain zinc hydroxide and a sulfate salt.

Moreover, the evaluation results of degreasing properties reveal that No. 51 to 53, which contain P in the film, have better degreasing properties than No. 12, which is not treated with a solution containing P ions.

INDUSTRIAL APPLICABILITY

A steel sheet of the disclosed embodiments is excellent in press formability and thus applicable to diverse fields centered on automobile body applications.

The invention claimed is:

1. A galvanized steel sheet comprising an oxide layer disposed on a surface of the galvanized steel sheet, the oxide layer (i) having an average thickness of 20 nm or more, and (ii) comprising 30 mg/m² or more of Zn, 1.0 mg/m² or more of S, and in range of 50 mg/m² or more and 1,000 mg/m² or less of polyethylene particles having an average particle size of 5.0 μm or less.

2. The galvanized steel sheet according to claim 1, wherein the oxide layer includes a sulfate group and a hydroxy group.

3. The galvanized steel sheet according to claim 1, wherein the oxide layer further comprises in a range of 0.2 mg/m² or more and 10 mg/m² or less of P.

4. The galvanized steel sheet according to claim 1, wherein the galvanized steel sheet is selected from the group consisting of a galvannealed steel sheet, a hot-dip galvanized steel sheet, and an electrogalvanized steel sheet.

5. A method for manufacturing the galvanized steel sheet according to claim 1, the method comprising bringing a galvanized steel sheet into contact with an acidic solution comprising 3 g/L or more of sulfate ions, 3 g/L or more of Zn ions, and 0.10 g/L or more of polyethylene particles.

6. The method for manufacturing the galvanized steel sheet according to claim 5, wherein the acidic solution has a pH in a range of 2 to 6 and a temperature in a range of 20° C. to 80° C.

7. The method for manufacturing the galvanized steel sheet according to claim 5, wherein the acidic solution further comprises an oxidizing agent.

8. The method for manufacturing the galvanized steel sheet according to claim 5, wherein a contact time between the galvanized steel sheet and the acidic solution is in a range of 1 second or more and 500 seconds or less.

9. The method for manufacturing the galvanized steel sheet according to claim 5, further comprising, after bringing the galvanized steel sheet into contact with the acidic solution, bringing the galvanized steel sheet into contact with a solution comprising 0.01 g/L or more of P ions.

10. A galvanized steel sheet comprising an oxide layer disposed on a surface of the galvanized steel sheet, the oxide layer (i) having an average thickness of 20 nm or more, and (ii) comprising 30 mg/m² or more of Zn, 1.0 mg/m² or more of S, and in range of 50 mg/m² or more and 1,000 mg/m² or less of polyethylene particles having an average particle size of 5.0 μm or less,
wherein the oxide layer includes a sulfate group and a hydroxy group.

11. The galvanized steel sheet according to claim 10, wherein the oxide layer further comprises in a range of 0.2 mg/m² or more and 10 mg/m² or less of P.

12. The galvanized steel sheet according to claim 10, wherein the galvanized steel sheet is selected from the group consisting of a galvannealed steel sheet, a hot-dip galvanized steel sheet, and an electrogalvanized steel sheet.

13. A method for manufacturing the galvanized steel sheet according to claim 10, the method comprising bringing a galvanized steel sheet into contact with an acidic solution comprising 3 g/L or more of sulfate ions, 3 g/L or more of Zn ions, and 0.10 g/L or more of polyethylene particles.

14. The method for manufacturing the galvanized steel sheet according to claim 13, wherein the acidic solution has a pH in a range of 2 to 6 and a temperature in a range of 20° C. to 80° C.

15. The method for manufacturing the galvanized steel sheet according to claim 13, wherein the acidic solution further comprises an oxidizing agent.

16. The method for manufacturing the galvanized steel sheet according to claim 13, wherein a contact time between the galvanized steel sheet and the acidic solution is in a range of 1 second or more and 500 seconds or less.

17. The method for manufacturing the galvanized steel sheet according to claim 13, further comprising, after bringing the galvanized steel sheet into contact with the acidic solution, bringing the galvanized steel sheet into contact with a solution comprising 0.01 g/L or more of P ions.

18. A galvanized steel sheet comprising an oxide layer disposed on a surface of the galvanized steel sheet, the oxide layer (i) having an average thickness of 20 nm or more, and (ii) comprising 30 mg/m$^2$ or more of Zn, 1.0 mg/m$^2$ or more of S, in a range of 0.2 mg/m$^2$ or more and 10 mg/m$^2$ or less of P, and in range of 50 mg/m$^2$ or more and 1,000 mg/m$^2$ or less of polyethylene particles having an average particle size of 5.0 μm or less, wherein the oxide layer includes a sulfate group and a hydroxy group.

19. The galvanized steel sheet according to claim 18, wherein the galvanized steel sheet is selected from the group consisting of a galvannealed steel sheet, a hot-dip galvanized steel sheet, and an electrogalvanized steel sheet.

20. A method for manufacturing the galvanized steel sheet according to claim 18, the method comprising:
bringing a galvanized steel sheet into contact with an acidic solution comprising 3 g/L or more of sulfate ions, 3 g/L or more of Zn ions, and 0.10 g/L or more of polyethylene particles; and
after bringing the galvanized steel sheet into contact with the acidic solution, bringing the galvanized steel sheet into contact with a solution comprising 0.01 g/L or more of P ions.

* * * * *